Nov. 18, 1941.　　　R. L. BROWNLEE　　　2,263,349
POWER CLUTCH
Filed Feb. 11, 1941　　　3 Sheets-Sheet 1

Nov. 18, 1941.    R. L. BROWNLEE    2,263,349
POWER CLUTCH
Filed Feb. 11, 1941    3 Sheets-Sheet 2

Inventor:
Robert L. Brownlee
By: Stevens & Batchelor
Atty's

Nov. 18, 1941.    R. L. BROWNLEE    2,263,349
POWER CLUTCH
Filed Feb. 11, 1941    3 Sheets-Sheet 3

Inventor:
Robert L. Brownlee
By: Stevens+Batchelor
Att'ys

Patented Nov. 18, 1941

2,263,349

UNITED STATES PATENT OFFICE 2,263,349

POWER CLUTCH

Robert L. Brownlee, Chicago, Ill.

Application February 11, 1941, Serial No. 378,454

6 Claims. (Cl. 192—66)

My invention relates to clutches forming part of power take-off units applicable to internal combustion engines, and more particularly to installations employing the engine flywheel as a driving source, and my main object is to provide a clutch of this kind which can be manually set in either the engaged or disengaged position.

A further object of the invention is to employ a yieldable medium in the engaging zone which cushions the action of the clutch and eliminates chatter and shock during the process of engagement.

A still further object of the invention is to transmit the drive to the clutch shaft at a point distant from the center of the clutch, so as to reduce the strain on the keyways between the clutch and its shaft and permit the use of a larger bearing for the clutch shaft.

Another object of the invention is to mount the clutch for rotation and stability entirely on the clutch shaft, and employ only driving means between the flywheel and the clutch.

An additional object of the invention is to provide self-retaining means for the engaging element of the clutch both in the engaged and disengaged positions.

Another object of the invention is to provide means for relieving the clutch shifting mechanism of stress or strain during either position of the engaging element.

A significant object of the invention is to provide novel means for taking up wear in the clutch engaging zone.

An important object of the invention is to design the clutch with parts which are simple and sturdy, whereby to make its manufacture economical and render it durable over a long period of use.

With the above objects in view and any others which may suggest themselves from the description to follow, a better understanding of the invention may be had by reference to the accompanying drawings, in which—

Fig. 4 is an enlarged detail section taken on the line 4—4 of Fig. 3 and showing the wear take-up in its original position;

Fig. 5 is a view similar to Fig. 4, showing the wear take-up adjusted to a partial extent;

Fig. 6 is an enlarged detail section taken on the line 6—6 of Fig. 1 and indicating the wear take-up in the same position as in Fig. 4;

Fig. 7 is a view similar to Fig. 6 and indicating the wear take-up adjusted as in Fig. 5.

Figure 1:
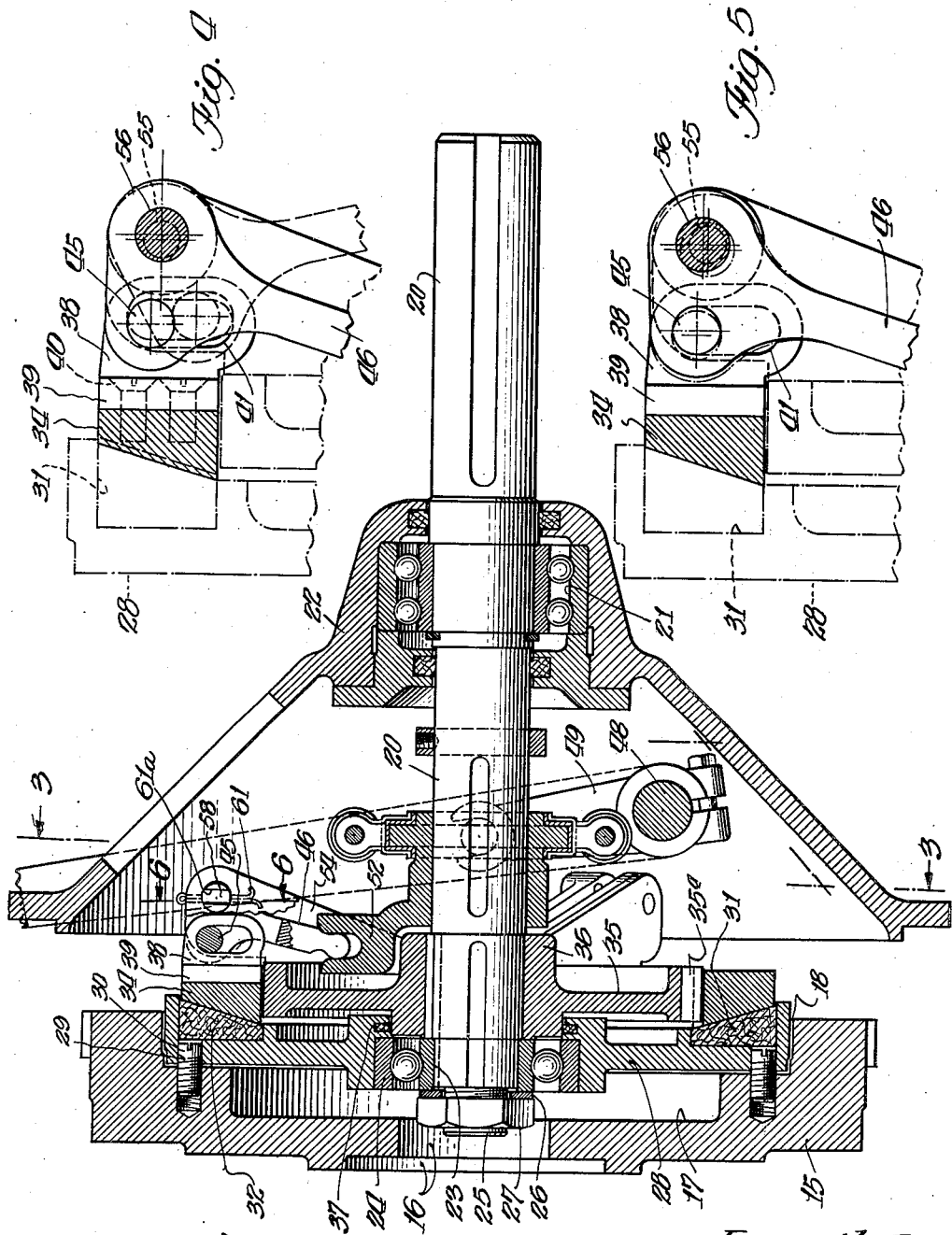
Fig. 1 is a longitudinal section of the clutch in the engaged position.

Clutches commonly applied to stationary as well as automotive engines contain powerful springs to keep the clutch in the engaged position. Obviously, considerable effort is required to disengage this type of clutch or to maintain it in the disengaged position. Also, the end thrust of the clutch in the engaged position is against the engine flywheel, and is transmitted to the engine bearings with wear thereof as a result. Also, with the conventional clutch driven in a zone near to the axis of the drive, it follows that the center bearing for the clutch shaft must be small, and therefore of inadequate strength for the shock and rotary strain of the clutch operations. These faults, and others of a less important character, contribute to impose a continual if not constant strain on the clutch mechanism as well as a burden or hardship to control the clutch. It has therefore been my intention to design a clutch in which most shocks and strains are eliminated, and whose control requires a minimum of time and effort.

In accordance with the foregoing, specific reference to the drawings indicates a typical engine flywheel at 15, the same having suitable central openings 16 to receive the engine crankshaft, which is not shown. The flywheel is made with the usual internal recess 17 in the frontal wall, and an enlargement thereof, numbered 18, in its rear end.

The clutch shaft is indicated at 20 and is supported in a rear bearing 21 of the clutch housing 22. At the front, the clutch shaft receives the inner portion 23 of a ball bearing 24. The shaft is then reduced with a terminal screw 25 which first receives a retainer ring 26 for the bearing portion 23 and then receives a securing nut 27 for the ring. The bearing portion 23 is thus locked against longitudinal movement relative to the shaft.

The bearing 24 is carried by a driving disk 28 which is freely disposed in the rear cavity 18 of the flywheel 15. However, the disk 28 is made with a number of holes 29 near its periphery to freely receive the outer portions of screws 30 which are driven into the flywheel at corresponding points. Thus, the screws 30 make a rotary driving connection from the flywheel to the disk 28 without requiring the latter to be attached in any manner to, or centered in the flywheel.

The driving disk 28 is annularly chambered in the rear, as indicated at 31, to receive a facing 32 of resilient material, such as neoprene, which can withstand considerable heat without deterioration or burning. Preferably, the facing 32 is in the form of a ring which has its rear face 33 with an inward bevel or incline; and a metal ring 34 is situated to the rear of the ring 32 and made with its forward face similar to and for the engagement of the ring 32. The ring 34 is positioned externally of a wheel 35, although it is only slidably keyed thereto as indicated at 35a, the wheel 35 having a hub 36 which is rigidly keyed to the clutch shaft 20. A packing 37 is preferably inserted between the disk 28 and the wheel hub 36 to prevent any oil which may be present in the ball bearing 24 from spreading to the faces of the clutch rings 32 and 34.

The clutch ring 34 receives a number of brackets 38 along its rear face, three being shown. Each bracket is formed with a base 39 which is attached to the ring 34 by means of screws 40. The brackets 38 are radially slotted as indicated at 41 in order to form followers for pins 45 carried by a set of clutch-actuating fingers 46.

The shifting of the clutch is primarily induced by the pivotal action of a hand lever 47 carried by a rock shaft 48 which is suitably journaled in the clutch housing 22. The rock shaft is fitted with a pair of arms 49 which rise to engage the trunnions 50 of a suitable shifting unit 51 which terminates at the front with a grooved collar 52. The inner end portion 53 of each clutch-actuating finger 46 is rounded to enable the collar 52 to swing the finger forth and back with facility, as indicated in Figs. 1 and 2.

Figures 3, 8:
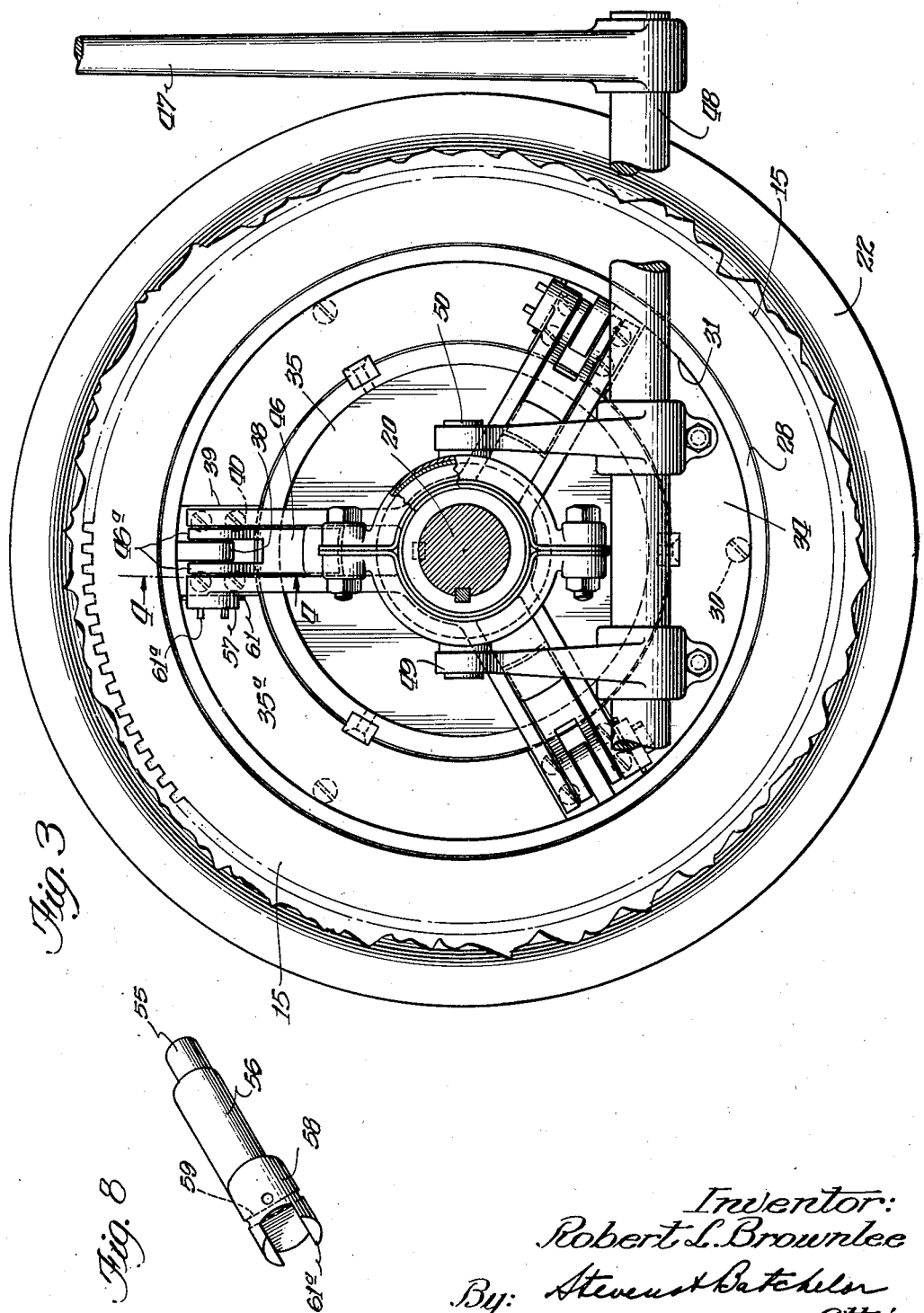
Fig. 3 is a section substantially on the line 3—3 of Fig. 1, showing certain parts broken away.
Fig. 8 is a perspective view of an eccentric cam employed in the wear take-up.

The wheel 35 is formed with a series of rearwardly projected wing sets, each set consisting of a pair of wings 54. The wing sets are distributed according to the placement of the brackets 38, each pair of wings receiving a bracket therebetween. The clutch-actuating fingers 46 are bifurcated in their upper portions as indicated at 46a to freely fit between the corresponding pairs of wings 54; also, the divisions of each finger receive the related bracket 38 between them, the arrangement just described being clearly evident from Fig. 3.

Figure 2:
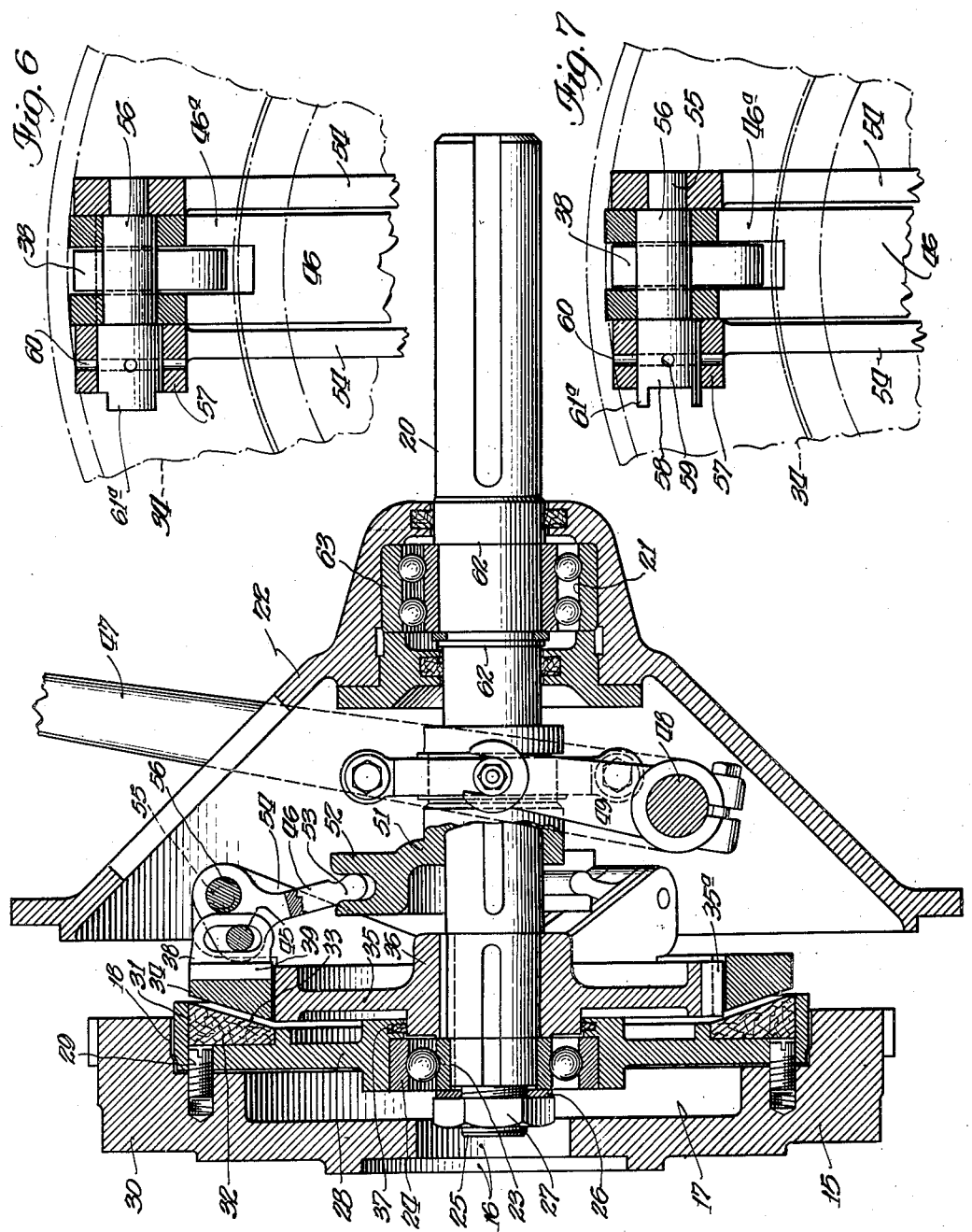
Fig. 2 is a similar view, showing the clutch in the disengaged position.

Primarily, it is apparent from Figs. 1 and 2 that each finger 46 is pivoted on a pin 55 to the corresponding pair of wings 54; also, the cross pin 46 passes through the opening 41 in the bracket 38 to lodge with its ends in the divisions of the finger 46. With the clutch collar 52 retracted, as indicated in Fig. 2, it is evident that each finger 46 has acted as a lever to withdraw the corresponding bracket 38 with the effect of disengaging the clutch, as shown, the slot 41 in each bracket making allowance for the substantially radial movement of each pin 45. However, as the clutch collar 52 moves forwardly to the position shown in Fig. 1, the movement of the pin 45 acts to engage the clutch; yet, the movement is beyond horizontal center, as noted, before it stops. It may be assumed that the clutch engaging action is coupled with a compressing effect upon the yieldable ring 32. Thus, when the pins 45 go slightly beyond horizontal center as their limit, the resistance exerted by the yieldable ring 32 maintains the pins 45 in their final positions. This means that the clutch-actuating fingers 46 need not have springs or other means to maintain them in their forward positions; also, the clutch remains engaged without the need of pressure on the part of the clutch collar 52, enabling the hand lever 47 to be released. Conversely, when the clutch is drawn out of engagement by the retraction of the hand lever 47, the effect of gravity on the hand lever will suffice to retain the clutch collar and other affected parts in the retracted positions, since there is no tendency in the mechanism to move the parts forwardly.

It is conceivable that the repeated action of engaging the clutch will, after a time, cause the yieldable ring 32 to slightly pack or wear. For this reason, I have provided a take-up in the zone of the pivot pin 55 by forming the same with an eccentric 56. While the end portions of the pin 55 are journaled in the wings 54, as shown in Figs. 6 and 7, the eccentric 56 passes through the divisions 46a of the clutch-actuating finger 46 in each case. It is thus seen that the rotation of the pin 55 will induce the movement of the finger in accordance with the profile of the eccentric.

Fig. 4 shows the original position of the eccentric in relation to one finger-actuated unit. Full lines show the clutch engaged by virtue of the forward swing of the finger, while dotted lines show the clutch disengaged by virtue of the rearward swing thereof. The crown of the eccentric is to the rear. After the clutch has received some wear, the parts shown in Fig. 4 may be adjusted to the positions of Fig. 5. It is evident that the eccentric has been moved with its crown at the top by turning the pin 55 ninety degrees in a counter-clockwise direction. While the illustration in Fig. 5 shows the clutch engaged, this is immaterial, for dot-and-dash lines show the change of position of the finger 46 in a forward direction, so that the engaging ring 34 of the clutch is closer to the yieldable ring 32 thereof. It follows that, with the pin 55 given a further quarter turn, the crown of the eccentric will move to a forward position, lending the engaging ring 34 a further advance.

In each instance, one of the wings 54 is thickened outwardly as indicated at 57 to form a bearing for the enlarged corresponding end portion 58 of the pin 55. This end portion has a cross bore 59 which comes into alinement with either of two diametrical bores 60 in the enlargement 57 when the pin is turned, the bores 60 being at right-angles to each other. Thus, a cotter-pin 61 may be passed through either bore 60 and the bore 59 to fix the pin 55 at the first and second positions of its previously described adjustment. Needless to say, the pin need not be locked in its original position, as the engaging action of the clutch will tend to keep it in such position. For facility to turn the pin, its enlarged portion 58 is extended with opposed lugs 61a between which a suitable wrench may be inserted to turn the pin.

It will be evident from the above description that I have provided a clutch which does not require its driving element to be secured in any way to or centered in the flywheel, so that no strain is imposed upon the same or the crankshaft bearings of the engine by the pressure of the clutch. The driving element is only rotatably connected with the flywheel; and it is locked endwise of the clutch shaft to form a backing or abutment for the clutch engagement. Therefore, when the clutch is in the engaged position both its driving and driven units turn with the shaft. Also, it is apparent that in such event even the bearing around the shaft does not run, since both the components of the bearing turn as a unit. It might be assumed that the forward thrust of the hand lever 47 to consummate the engagement of the clutch would advance the rotating assembly as a unit against the flywheel and impose end-thrust against the same and the engine bearings. However, it is noted that the shaft 20 is locked from forward motion relative to its housing 22 by being formed with suitable shoulders 62 in a ball bearing 63 which is fixed in the rear of the housing, so that the shaft may be considered as immovable longitudinally.

In regard to the clutch-engaging zone, it is noted that the same is distant from the center of the clutch, affording a better purchase and offering a large area of clutch contact; also, the fact that this zone is distant from the center allows a relatively large bearing to be used for the clutch shaft, making for more reliable and durable performance of the bearing.

The self-retaining feature in the clutch control does away with the use of a sizable spring or other means to keep the clutch engaged. In the present embodiment the resistance of the clutch lining becomes an inherent retaining means in cooperation with the past-center feature of the shifting limit, as previously described, this arrangement being simple and imposing no strain on the clutch or its control at any time. Further, the simple wear take-up is positive and easily adjustable; in fact, the take-up can be varied in one instance or another according to degrees of wear in the corresponding clutch zone, in case the facing 32 wears unevenly. Finally, it is apparent that the novel clutch mechanism is made up of parts which are simple, sturdy and operate in accordance with well established mechanical principles.

While I have described the invention along specific lines, various minor changes and refinements may be made without departing from its principle, and I desire to consider all such changes and refinements as coming within the scope and spirit of the appended claims.

I claim:

1. A clutch comprising a rotary driving member having an annular clutch facing, a shaft in substantially axial alinement with the driving member, a driven member carried by the shaft, a clutch ring connected for rotation with the driven member and slidable in parallelism to the shaft toward and from said clutch facing, a slidable shifter collar on the shaft, and pivoted means between the shifter collar and the clutch ring to actuate the same according to the movement of the shifter collar, brackets extended from the clutch ring and formed with perforated followers, and said pivoted means comprising extensions of the driven member alongside the brackets, fingers pivoted intermediate their ends in said extensions, one of the ends of said fingers being linked in said shifter collar, and the other ends of the fingers having pins extending slidably into the perforations of said followers.

2. A clutch comprising a rotary driving member having an annular clutch facing, a shaft in substantially axial alinement with the driving member, a driven member carried by the shaft, a clutch ring connected for rotation with the driven member and slidable in parallelism to the shaft toward and from said clutch facing, a slidable shifter collar on the shaft, and pivoted means between the shifter collar and the clutch ring to actuate the same according to the movement of the shifter collar, brackets extended from the clutch ring and formed with perforated followers, and said pivoted means comprising extensions of the driven member alongside the brackets, one of the ends of said fingers being linked in said shifter collar, the other ends of the fingers having pins extending slidably into the perforations of said followers, the brackets being circularly-distributed and radially directed, and the perforations in the brackets being radially elongated to allow for the arcuate travel of the pins during their movement toward and from said clutch facing.

3. A clutch comprising a rotary driving member having an annular clutch facing, a shaft in substantially axial alinement with the driving member, a driven member carried by the shaft, a clutch ring connected for rotation with the driven member and slidable in parallelism to the shaft toward and from said clutch facing, a slidable shifter collar on the shaft, and pivoted means between the shifter collar and the clutch ring to actuate the same according to the movement of the shifter collar, circularly-spaced brackets extended from the clutch ring and formed with perforated followers, and said pivoted means comprising a pair of plates extended from the driven member and on opposite sides of each follower, a finger between each pair of plates and bifurcated to straddle the follower therebetween, a pivot pin carried by each pair of plates and freely passing through an intermediate portion of the corresponding finger, one terminal portion of said finger being linked to said shifter collar, and the other terminal of said finger having a pin freely passing through the perforation in the related follower.

4. A clutch comprising a rotary driving member having an annular clutch facing, a shaft in substantially axial alinement with the driving member, a driven member carried by the shaft, a clutch ring connected for rotation with the driven member and slidable in parallelism to the shaft toward and from said clutch facing, a slidable shifter collar on the shaft, and pivoted means between the shifter collar and the clutch ring to actuate the same according to the movement of the shifter collar, said clutch facing being yieldable, circularly-spaced brackets extended from the clutch ring and formed with perforated followers, and said pivoted means comprising support means extended from the driven member in the zone of each follower, a finger pivoted in each support means and extended for actuation by said shifter collar, the finger having a pin freely passing through the perforation in the related follower, and the stroke of the finger in the clutch-engaging direction being to carry the pin to a point beyond the shortest path from the finger pivot to the clutch ring, whereby to compress said facing during the clutching action and cause the resistance of the facing to check the return of the pin from said point.

5. A clutch comprising a driving member, a shaft, a driven member movable in parallelism to the shaft toward and from the driving member for clutch engagement and release, a shifter collar slidable on the shaft, a motion transmission mechanism between the shifter collar and the driven member, and means in said mechanism to advance the driven member in the direction of the driving member as a take-up for wear in the clutching zone, said mechanism including a circularly-spaced set of supports extended from the driven member, a pin carried by each support and formed with an eccentric enlargement, a finger leading from the shifter collar to be freely pivoted on the eccentric enlargement, and an operative connection between each finger and the driven member, the rotary adjustment of each eccentric enlargement controlling the position of the affected portion of the driven member in relation to the driving member.

6. A clutch comprising a driving member, a shaft, a driven member movable in parallelism to the shaft toward and from the driving member for clutch engagement and release, a shifter collar slidable on the shaft, a motion transmission mechanism between the shifter collar and the driven member, and means in said mechanism to advance the driven member in the direction of the driving member as a take-up for wear in the clutching zone, said mechanism including a circularly-spaced set of supports extended from the driven member, a pin carried by each support and formed with an eccentric enlargement, a finger leading from the shifter collar to be freely pivoted on the eccentric enlargement, an operative connection between each finger and the driven member, the rotary adjustment of each eccentric enlargement controlling the position of the affected portion of the driven member in relation to the driving member, and means to fix the position of the eccentric enlargement at different points of its adjustment.

ROBERT L. BROWNLEE.